No. 698,391. Patented Apr. 22, 1902.
B. CANNON.
WIND WHEEL.
(Application filed May 31, 1901.)
(No Model.) 3 Sheets—Sheet 1.
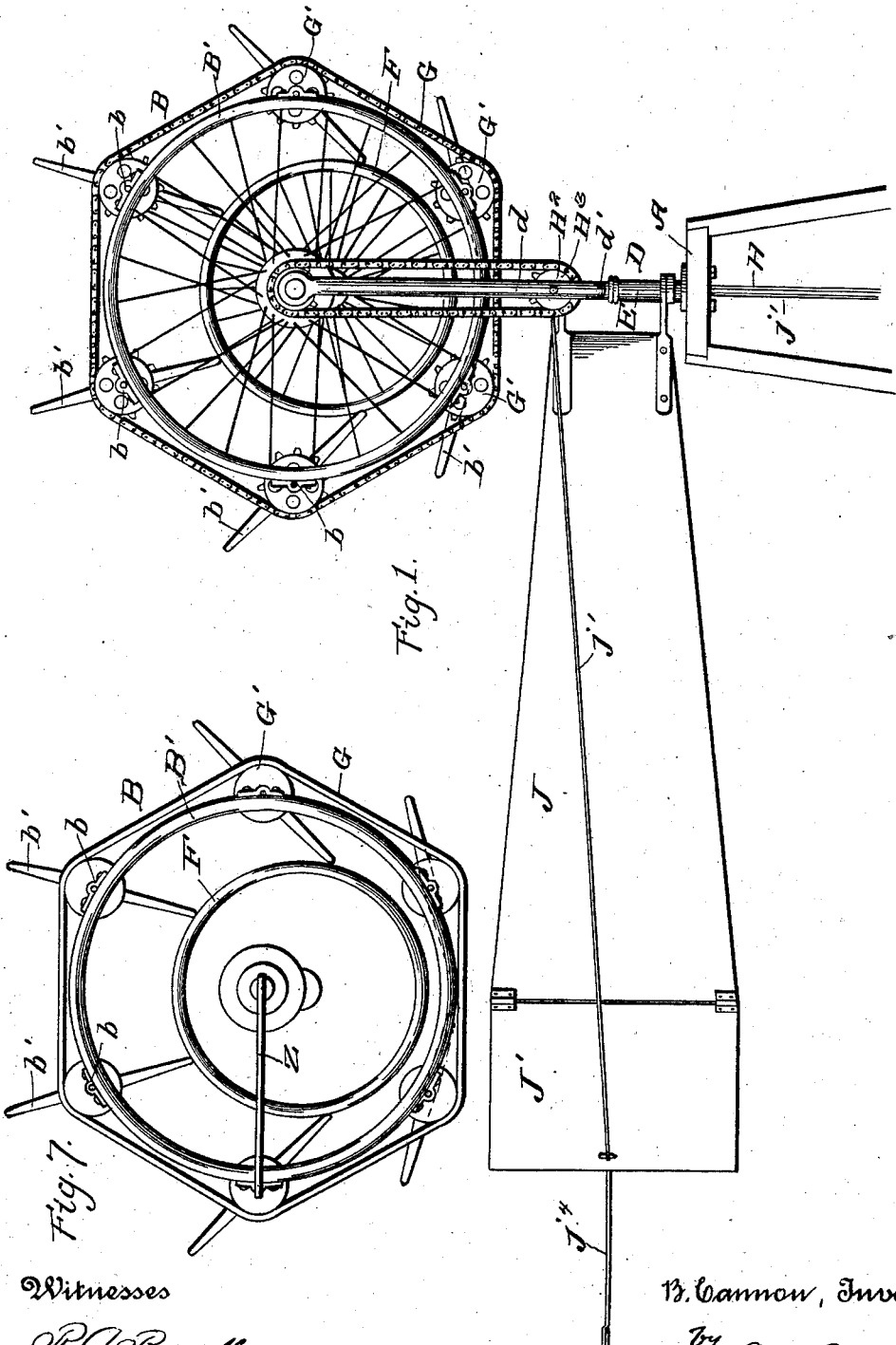
Witnesses
R. A. Boswell
George M. Anderson
B. Cannon, Inventor
by E. W. Anderson
Attorney No. 698,391. Patented Apr. 22, 1902.
B. CANNON.
WIND WHEEL.
(Application filed May 31, 1901.)
(No Model.) 3 Sheets—Sheet 2.
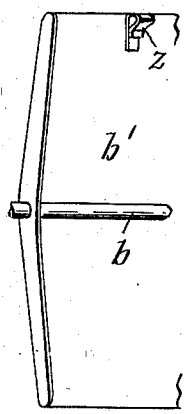
Fig. 5.
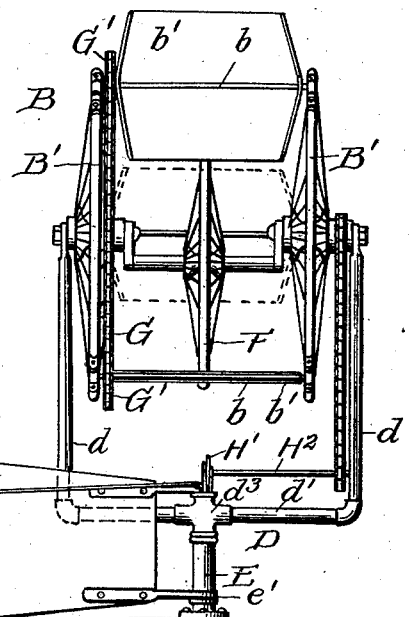
Fig. 2.
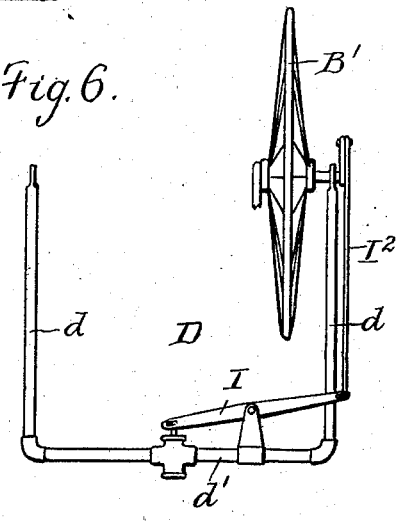
Fig. 6.
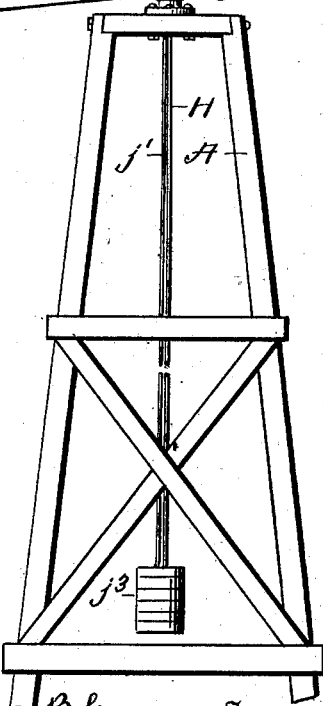
Witnesses
George M. Anderson
R. A. Boswell.
by
B. Cannon, Inventor
E. W. Anderson
Attorney No. 698,391. Patented Apr. 22, 1902.
B. CANNON.
WIND WHEEL.
(Application filed May 31, 1901.)

(No Model.) 3 Sheets—Sheet 3.

Witnesses
George M. Anderson
R. A. Boswell by

B. Cannon,
Inventor
E. W. Anderson
Attorney

UNITED STATES PATENT OFFICE.

BURRELL CANNON, OF PITTSBURG, TEXAS.

WIND-WHEEL.

SPECIFICATION forming part of Letters Patent No. 698,391, dated April 22, 1902.

Application filed May 31, 1901. Serial No. 62,508. (No model.)

*To all whom it may concern:*

Be it known that I, BURRELL CANNON, a citizen of the United States, and a resident of Pittsburg, in the county of Camp and State of Texas, have made a certain new and useful Invention in Wind-Wheels; and I declare the following to be a full, clear, and exact description of the same, such as will enable others skilled in the art to which it appertains to make and use the invention, reference being had to the accompanying drawings, and to letters of reference marked thereon, which form a part of this specification.

This invention has relation to wind-wheels, and has for its object the provision of a novel form of wheel operating upon a novel principle for the utilization of a maximum percentage of the energy of the wind or of increasing mechanical efficiency and having special devices in connection therewith for throwing the wheel more or less out of or the blades of the wheel more or less edgewise to the wind under variations in the wind-pressure to accomplish the work to be performed at a uniform rate of speed or to throw the wheel completely out of the wind to stop the rotation thereof under the influence of high or dangerous winds.

With this object in view the invention consists in the novel construction and combination of parts, all as hereinafter described, and pointed out in the appended claims.

Figure 4:
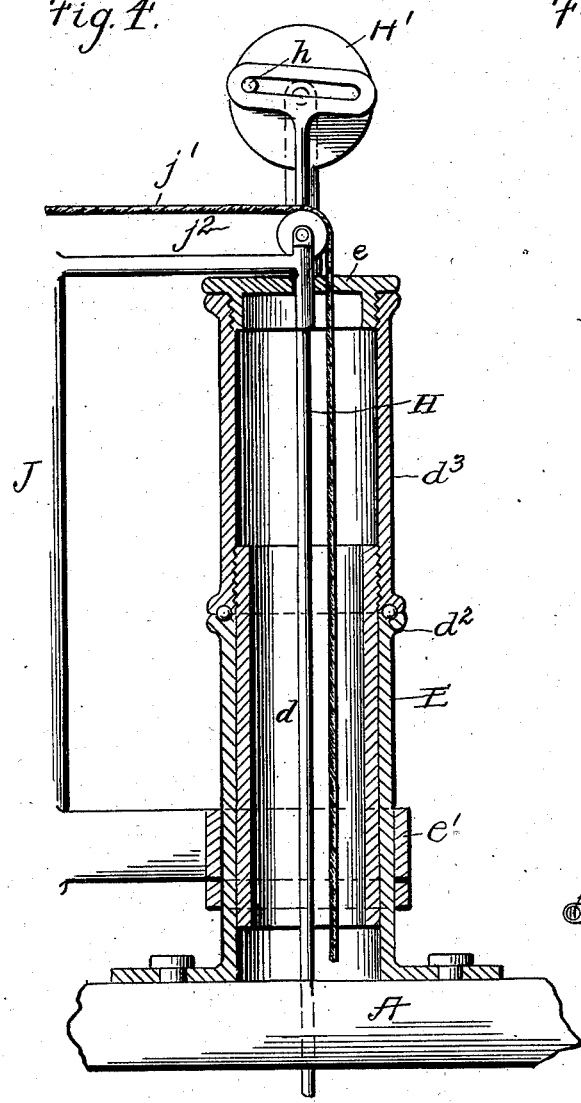
Figure 3:
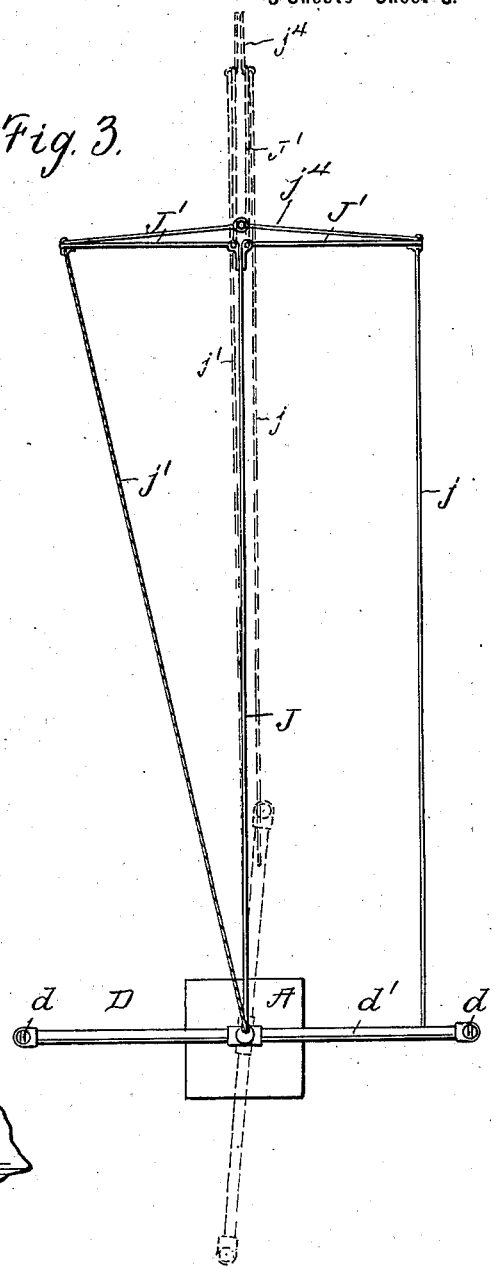

In the accompanying drawings, Figure 1 is a side elevation of my wind-wheel. Fig. 2 is a similar view with the wheel thrown around at right angles to the vane. Fig. 3 is a plan view of the wheel-supporting frame and vane, showing wings J' closed and supporting-frame D thrown around nearly parallel with the vane in dotted lines. Fig. 4 is a section on a larger scale, illustrating connections of vane with tube E and joint $d^3$, ball-bearings of wheel-supporting frame, &c. Fig. 5 is a detail view illustrating bracket $z$. Fig. 6 is a detail view illustrating modified driving connection of pump-rod and wind-wheel, and Fig. 7 is a plan view of my wheel arranged horizontally.

Referring to the drawings, the letter A designates the tower of a wind-wheel, and B the wind-wheel journaled in suitable bearings in the vertical arms or branches $d$ of supporting-frame D, transverse arm $d'$ connecting branches $d$ at their lower end portions and turning centrally upon a vertical axis having suitable ball-bearings $d^2$ in base-piece E, bolted to the top of the tower. Said arms are preferably tubular, connected by elbows, the sections of cross-arm $d'$ having a central T-joint connection $d^3$, a downward extension $d^4$ of said joint having a screw-threaded engagement therewith telescoping into base piece or pipe E and turning in close bearings therein.

The wheel consists of lateral heads B' of light but strong character, having, preferably, tubular rims and wire spokes, similar to a bicycle-wheel. Journaled in the peripheral portions or rims of these wheels are the wheel-fan shafts $b$, six being shown, and carrying centrally fixed thereto the fans or blades $b'$, having a width about equal to the distance separating the heads B' and preferably of rectangular or double-trapezoidal form, tapering at the sides toward both ends.

F is a guide-wheel eccentrically mounted in crank-bearings $f$, connecting the two heads B', this wheel being of similar construction to that of said heads. The blades or fans $b'$ take a bearing centrally of their ends upon the rim of wheel F, being thereby turned with their shafts as they revolve, occupying radial positions with respect to the wind-wheel when in full operative position at the top or bottom of the wheel to utilize the full force of the wind and gradually approaching toward and receding from such position at opposite sides of the wheel when they have opposite inclinations and assuming a tangential position with respect to the wheel at points opposite those in which they are in full operative position, all by the same guiding action of eccentric wheel F, in connection with sprocket-chain G, passing around and connecting sprocket-wheels G', one upon each shaft $b$. Upon the downstroke and upstroke of the fans they assume opposite inclinations to the radial line and gradually increase and lessen such inclination upon the termination of such strokes until upon one side or at the top of the wheel the full radial position is assumed and at opposite points upon the wheel the tangential position is assumed, opposite end portions of each blade being presented forwardly or outwardly upon successive rotations of the wheel. Each blade is thus being positively driven at every point in its revolution or stroke except when in the tangential or edgewise position, when it presents no resistance to the wind.

For working purposes the pump-rod H has a slot and wrist-pin connection $h$ with wheel H' upon shaft $H^2$, parallel with cross-arm $d'$ and rotating in suitable bearings supported therefrom. This shaft carries sprocket-wheel $H^3$, having a sprocket-chain connection with a smaller wheel upon the shaft of the wind-wheel, or, as shown in drawings, a rock-lever I may be employed in place of shaft $H^2$, such lever being centrally pivoted to cross-arm $d'$ and having a pivotal connection with the pump-rod at one end portion and at its opposite end portion pivoted to connecting-rod $I^2$, having a crank connection with the wind-wheel shaft.

For the purpose of relieving my wheel from undue strain in high or dangerous winds I provide the vane J, which is arranged to turn upon the same axis as the cross-arm $d'$, which has a ball-bearing in the base-pipe E, said vane having a pivotal engagement with a screw-cap $e'$ of T-joint $e$ at its upper end portion and a strap connection $e'$ with base-pipe E at its lower portion. To the outer end of vane J are pivoted the pair of vibratory wings or fans J', one of said fans having a rod connection $j$ with an outer portion of cross-arm $d'$ and the other fan having a rope or cable $j'$ attached to its outer portion, passing over guide-pulley $j$, carried by the vane, and down through the T-joint $e$ and base-pipe E, a weight $j^3$ being suspended from said rope or cable, which will thus hold the fans normally open or apart, a knee or toggle joint $j^4$ connecting the fans to assure their working in unison.

The weight $j^3$ is adjusted in accordance with the general force of the wind to hold the fans of the wheel squarely against the wind, increase in wind-pressure causing the vane-fans to close to a greater or less degree, thus pulling upon cross-arm $d'$ at one side thereof through connection $j$ to turn the wheel to one side, with its fans or blades presented more or less edgewise to the wind and maintaining a uniform rate of rotation of the wind-wheel.

Under the influence of winds of high or dangerous character the wheel will be thrown completely to one side, with its fans presented entirely edgewise to the wind to stop the rotation.

My wind-wheel may also be arranged with its shaft vertical, as shown in drawings, in which case the shaft of the eccentric wheel carries rigidly fixed thereto a planular vane $z$, the relation of vane and eccentric wheel being such that when the plane of the vane lies in the direction of the wind the eccentric wheel will be swung to the proper position to throw the wheel blades or fans directly against the wind.

A bracket is carried by the central portion of the extremity of each blade and is arranged to take a bearing against the eccentric wheel at $z$ during a portion of the revolution of each fan for the purpose of exerting a pull upon the chain connecting the fans when needed to draw the fans past radial position in starting the wheel in rotation, a bind being otherwise likely to occur at this point.

Under rapid operation no chain connection is needed for the fans or blades, nor any devices for pulling the fans past radial position.

Having thus described my invention, what I claim as new, and desire to secure by Letters Patent, is—

1. A wind-wheel, having the centrally-pivoted fans, the eccentric wheel engaging said fans, and the belt connection for the fan pivots or shafts, substantially as specified.

2. A wind-wheel, having the opposite skeleton heads, the skeleton eccentric wheel hung in crank-bearings in said heads, the fan-shafts journaled in the peripheral portions of said heads, the fans fixed to said shafts, and arranged to bear upon the rim of said eccentric wheel, and means for turning said wind-wheel to one side to present the fans more or less edgewise to the wind under variations in the force thereof, substantially as specified.

3. In a wind-wheel, the combination with the pivoted fans, the eccentric wheel upon which said fans bear, and the endless belt connecting the shafts of said fans, of means operating in connection with said eccentric wheel and belt for exerting a pull upon said belt at intervals to draw the fans past radial position, substantially as specified.

4. In a wind-wheel, the combination with the pivoted fans, the eccentric wheel, and the sprocket-chain connecting the shafts of said fans, of brackets carried by said fans, and arranged to take a bearing upon the rim of said eccentric wheel to exert a pull upon said chain at intervals to draw the fans past radial position, substantially as specified.

5. The combination with a wind-wheel having the supporting-frame turning upon a vertical axis, of a vane turning upon the same axis as said frame, the pair of fans pivoted to said vane, the knee or toggle joint connecting said fans, one of said fans having a connection with said frame, and the other said fan having a rope or cable attachment, upon which a weight is suspended, substantially as specified.

In testimony whereof I affix my signature in presence of two witnesses.

B. CANNON.

Witnesses:
HERBERT C. EMERY,
GEORGE M. ANDERSON.